United States Patent
Kobayashi

(10) Patent No.: US 8,289,533 B2
(45) Date of Patent: Oct. 16, 2012

(54) PRINTING SYSTEM AND PRINTING METHOD FOR INCREASING EFFICIENCY BY SELECTIVELY RASTERIZING PRINT DATA IN EITHER A HOST DEVICE OR A PRINT DEVICE

(75) Inventor: Masaki Kobayashi, Kodaira (JP)

(73) Assignees: Casio Electronics Manufacturing Co., Ltd., Iruma-Shi (JP); Casio Computer Co., Ltd., Tokyo (JP)

( * ) Notice: Subject to any disclaimer, the term of this patent is extended or adjusted under 35 U.S.C. 154(b) by 1223 days.

(21) Appl. No.: 12/101,257

(22) Filed: Apr. 11, 2008

(65) Prior Publication Data

US 2008/0252929 A1    Oct. 16, 2008

(30) Foreign Application Priority Data

Apr. 13, 2007  (JP) ................................. 2007-106036
Feb. 28, 2008  (JP) ................................. 2008-048067

(51) Int. Cl.
   *G06F 3/12*    (2006.01)
(52) U.S. Cl. ........ 358/1.13; 358/1.15; 358/1.1; 358/1.6; 358/1.9; 358/1.11
(58) Field of Classification Search .............. 358/13, 358/1.15, 1.1, 1.6, 1.9, 1.11, 1.13
   See application file for complete search history.

(56) References Cited

U.S. PATENT DOCUMENTS

| | | | | |
|---|---|---|---|---|
| 6,665,081 | B1 * | 12/2003 | Suzuki et al. | 358/1.13 |
| 6,891,632 | B2 * | 5/2005 | Schwartz | 358/1.15 |
| 2003/0228184 | A1 * | 12/2003 | Nishitani | 400/76 |
| 2005/0058371 | A1 * | 3/2005 | Huang et al. | 382/300 |

FOREIGN PATENT DOCUMENTS

JP    2006-155307 A    6/2006

* cited by examiner

*Primary Examiner* — Benny Q Tieu
*Assistant Examiner* — Paul F Payer
(74) *Attorney, Agent, or Firm* — Holtz, Holtz, Goodman & Chick, P.C.

(57) ABSTRACT

A printing system comprises a host device like a personal computer (PC) which creates print data (GDI data) based on an application, and selects through which a conversion process either a first conversion process of converting the data into PDL data or a second conversion process of converting the data into image data should be executed based on the performance of the host device connected to a printing device, the kind of the application, and the like when performing the conversion process on the print data and transmitting the converted data to a printing device, and further selects the conversion process based on a command in GDI data, a data size, and the like, thereby automatically selecting the most efficient printing scheme, and the printing device which prints out the print data transmitted from the host device.

5 Claims, 6 Drawing Sheets

FIG. 3

| APPLICATION PROGRAM NAME #1 | AdobeReader |
|---|---|
| APPLICATION PROGRAM NAME #2 | AdobeAcrobat |
| APPLICATION PROGRAM NAME #3 | --- |
| : | : |
| APPLICATION PROGRAM NAME #n | --- |

| APPLICATION PROGRAM NAME #1 | Microsoft Word |
|---|---|
| APPLICATION PROGRAM NAME #2 | JustSystem ICHITARO |
| APPLICATION PROGRAM NAME #3 | --- |
| : | : |
| APPLICATION PROGRAM NAME #n | --- |

| GDI DATA NAME #1 | BitBlt |
|---|---|
| GDI DATA NAME #2 | StretchBlt |
| GDI DATA NAME #3 | --- |
| : | : |
| GDI DATA NAME #n | --- |

18

PRINTING SYSTEM AND PRINTING METHOD FOR INCREASING EFFICIENCY BY SELECTIVELY RASTERIZING PRINT DATA IN EITHER A HOST DEVICE OR A PRINT DEVICE

BACKGROUND OF THE INVENTION

1. Field of the Invention

The present invention relates to a printing system in which a printing device performs a printing job on the basis of print data transmitted from a host device.

2. Description of the Related Art

Print data on a host device like a personal computer (PC) is output to a printing device through a printer driver. In general, such a printer driver employs either one of or both of scheme of transmitting print data while converting the print data into the PDL (Page Description Language) of the printing device, and scheme of transmitting print data undergone rasterizing to the printing device as image data.

The foregoing schemes have both merits and demerits, and for example, in case of the scheme of transmitting print data converted into the PDL, the process of the printer driver which operates on the host device becomes a relatively light processing load, while the process of the printing device becomes a heavy processing load. In contrast, in case of the scheme of transmitting print data undergone rasterizing to the printing device, the process of the printer driver becomes heavy, but the process of the printing device becomes relatively light.

Unexamined Japanese Patent Application KOKAI Publication No. 2006-155307 discloses a technology such that the printer driver changes an abstraction level in accordance with the operating status of an image processing device, and progresses a process up to a state where the abstraction level is low when the operating status becomes busy and a latency time is long, thereby reducing the load of rendering process on the image processing device.

Even though both schemes are selected and changed over, however, there are two cases that a printing job is made fast by the scheme of converting print data into the PDL on the host device, and the printing job is made fast by the scheme of transmitting print data undergone rasterizing, depending on the property of print data, the performance of the host device, and the like. Even if it is determined that which scheme can make the printing job fast, changing the setting of the printer driver case by case is a bothersome process.

SUMMARY OF THE INVENTION

Accordingly, it is an object of the present invention to provide a printing system and a host device which automatically determine the performance of the host device, the characteristic of print data, and the like, and decide a scheme for a print job, thereby performing the print job efficiently.

That is, depending on the performance of a personal computer that executes an application program (hereinafter, simply called "application" sometimes) which creates print data, there are two cases that a printing job can be executed fast when the processor of the personal computer executes a process of converting print data into image data, and the printing job becomes faster when the processor of a printing device connected to the personal computer executes that process. One of the feature of the present invention is to identify which case can make the printing job fast based on information on the process speed of the processor of the personal computer, and to automatically changes a mode to another mode in such a way that a print data conversion process is to be executed by either one of the processors which can execute the process most appropriately and efficiently.

Depending on the kinds of application programs, a large load may be applied in a process of converting created print data into image data, and there are also two cases that a printing job becomes fast when the processor of the high-performance personal computer executes the process, and the printing job becomes fast when the processor of the printing device executes that process, depending on the kinds of the application programs. The characteristics application programs are known beforehand. Accordingly, another feature of the invention is to recognize the kind of an application program, and to automatically change a scheme to the most appropriate scheme for a print data conversion process in accordance with a recognition result.

Further, depending on a content of GDI data included in print data created by an application, there are two cases that a printing job becomes fast when the processor of the high-performance personal computer executes a process and the printing job becomes fast when the processor of the printing device executes that process in converting created GDI data into image data, depending on the content of the GDI data. The characteristic of such GDI data is also known beforehand. Accordingly, the other feature of the invention is to recognize a kind of GDI data created by an application program, and to automatically change a scheme to the most appropriate scheme for a print data conversion process in accordance with a recognition result.

A host device according to the first aspect of the invention is connected to a printing device, and comprises: an application processor that executes an application program for creating print data; a first conversion unit that converts print data, created based on the application program, into image data; a second conversion unit that converts print data, created based on the application program, into PDL data; a determination unit that determines which of the first conversion unit or the second conversion unit to use for performing the conversion process on the print data based on a performance of the application processor; and a transmission unit that transmits the print data undergone the conversion process in accordance with a determination result to the printing device.

A host device according to the second aspect of the invention is connected to a printing device, and comprises: an application processor that executes an application program for creating print data; a first conversion unit that converts print data, created based on the application program, into image data; a second conversion unit that converts print data, created based on the application program, into PDL data; a determination unit that determines which of the first conversion unit or the second conversion unit to use for performing the conversion process on the print data based on a kind of the application program; and a transmission unit that transmits the print data undergone the conversion process in accordance with a determination result to the printing device.

The determination unit may perform determination further based on a command included in the print data.

The determination unit may perform determination further based on a page size of the print data.

Determination based on a command may be executed for each page in the print data, i.e., page unit by page unit.

Determination based on a command may be executed for a first page in the print data, and a conversion process for a following page may be executed based on a determination result for the first page.

A printing system according to the third aspect of the invention comprises a host device and a printing device both connected together, and wherein the host device includes: an application processor that executes an application program for creating print data; a first conversion unit that converts print data, created based on the application program, into image data; a second conversion unit that converts print data, created based on the application program, into PDL data; a determination unit that determines which of the first conversion unit or the second conversion unit to use for performing the conversion process on the print data based on a performance of the host device; and a transmission unit that transmits the print data undergone the conversion process in accordance with a determination result to the printing device, and the printing device includes: a processor that performs rasterizing on PDL data converted by the second conversion unit; an image memory that renders image data resulting from a process by the processor, or image data converted by the first conversion unit; and a printing unit that prints the image data stored in the image memory on a recording medium.

A printing system according to the fourth aspect of the invention comprises a host device and a printing device both connected together, and wherein the host device includes: an application processor that executes an application program for creating print data; a first conversion unit that converts print data, created based on the application program, into image data; a second conversion unit that converts print data, created based on the application program, into PDL data; a determination unit that determines which of the first conversion unit or the second conversion unit to use for performing the conversion process on the print data based on a kind of the application program; and a transmission unit that transmits the print data undergone the conversion process in accordance with a determination result to the printing device, and the printing device includes: a processor that performs rasterizing on PDL data converted by the second conversion unit; an image memory that renders image data resulting from a process by the processor, or image data converted by the first conversion unit; and a printing unit that prints the image data stored in the image memory on a recording medium.

The determination unit may perform determination further based on a command included in the print data.

The determination unit may perform determination further based on a page size of the print data.

Determination based on a command may be executed for each page in the print data, i.e., page unit by page unit.

Determination based on a command may be executed for a first page in the print data, and a conversion process for a following page may be executed based on a determination result for the first page.

A printing method according to the fifth aspect of the invention is executed by a host device connected to a printing device, and comprises: a process of creating print data based on an application program; a first conversion process of converting print data, created based on the application program, into image data; a second conversion process of converting print data, created based on the application program, into PDL data; a determination process of determining through which conversion process the print data is to be processed either the first conversion process or the second conversion process based on a performance of the process or a kind of the application program; and a transmission process of transmitting the print data undergone the conversion process in accordance with a determination result to the printing device.

The determination process may be executed further based on a command included in the print data or a page size of the print data.

BRIEF DESCRIPTION OF THE DRAWINGS

The object and other objects and advantages of the present invention will become more apparent upon reading of the following detailed description, taken in conjunction with the accompanying drawings in which:

FIG. 3 is a diagram showing an example of a table of APLs (applications) to be subject to a process through a scheme A;

FIG. 4 is a diagram showing an example of a table of APLs (applications) to be subjected to a process through a scheme B;

FIG. 5 is a diagram showing an example of a table of commands to be subjected to a process through the scheme A depending on the kind of a command included in GDI data;

DETAILED DESCRIPTION OF THE PREFERRED EMBODIMENT

An explanation will be given of the embodiment of the invention with reference to the accompanying drawings.

Figure 1:
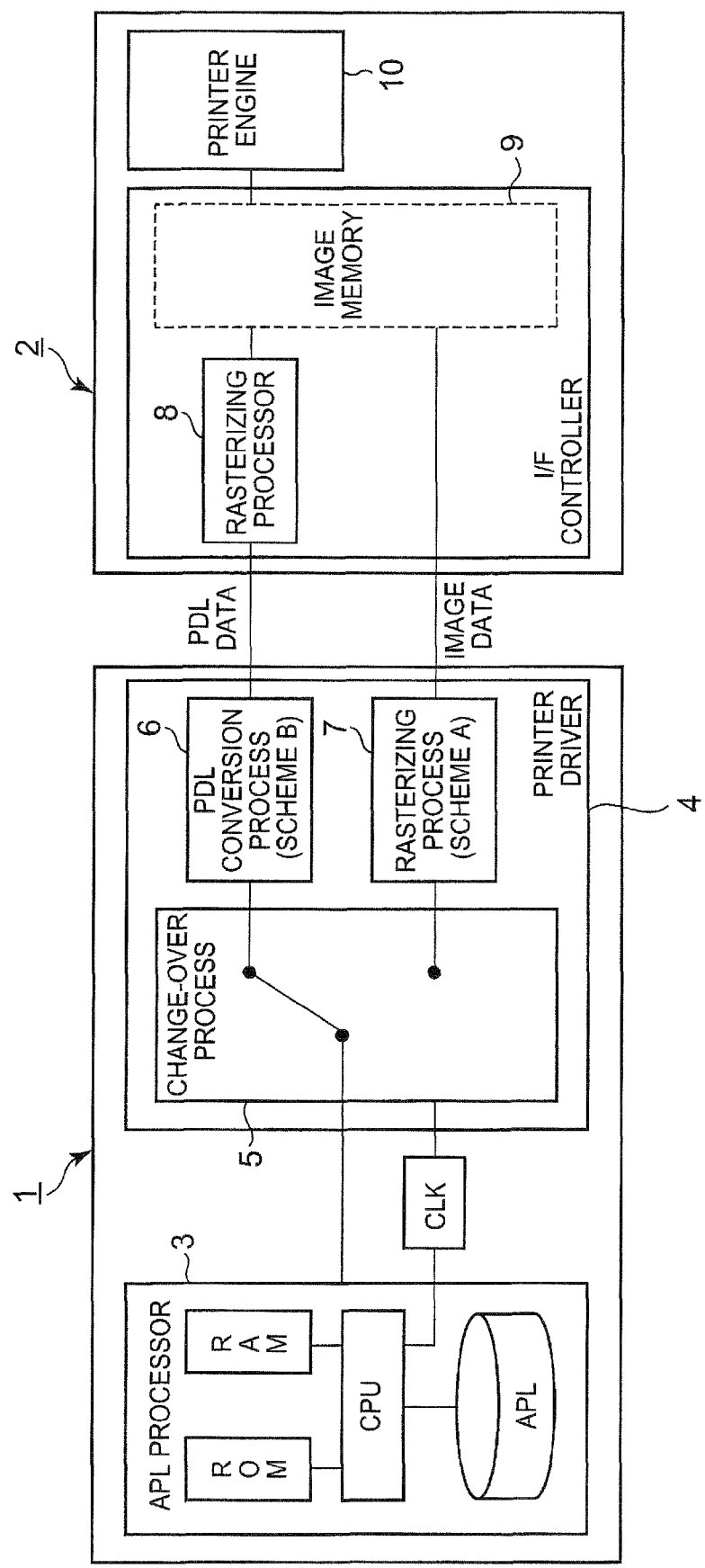
FIG. 1 is a system configuration diagram of a printing system according to an embodiment.

FIG. 1 is a system configuration diagram of a printing system according to the embodiment. In the figure, the system comprises a personal computer (PC) 1 serving as a host device, and a printer 2 serving as a printing device. The personal computer 1 has an application processor 3 which executes an application program (APL), and a printer driver 4. Print data created using the application (APL) is supplied to the printer driver 4, and the printer driver 4 converts the print data into a data format appropriate for the printer 2 to process, and then transmits the converted data to the printer 2.

Specifically, the print data is GDI (Graphics Device Interface) data that information created by the application (APL) and indicating a print instruction is converted into a command (GDI function) processable for the printer driver 4 by the GDI.

The printer driver 4 of the invention identifies the content (command) of GDI data, and executes a change-over process 5 in accordance with an identification result. In accordance with the change-over process 5, either one of a PDL (Page Description Language) conversion process 6 or a rasterizing process 7 is selectively executed. In a case where the print data is converted through the PDL conversion process 6, the print data is output to a rasterizing processor 8. On the other hand, in a case where the print data is converted into image data, the print data is directly output to an image memory 9 of the printer 2. The printer 2 executes a print job based on the image data.

Figure 2:
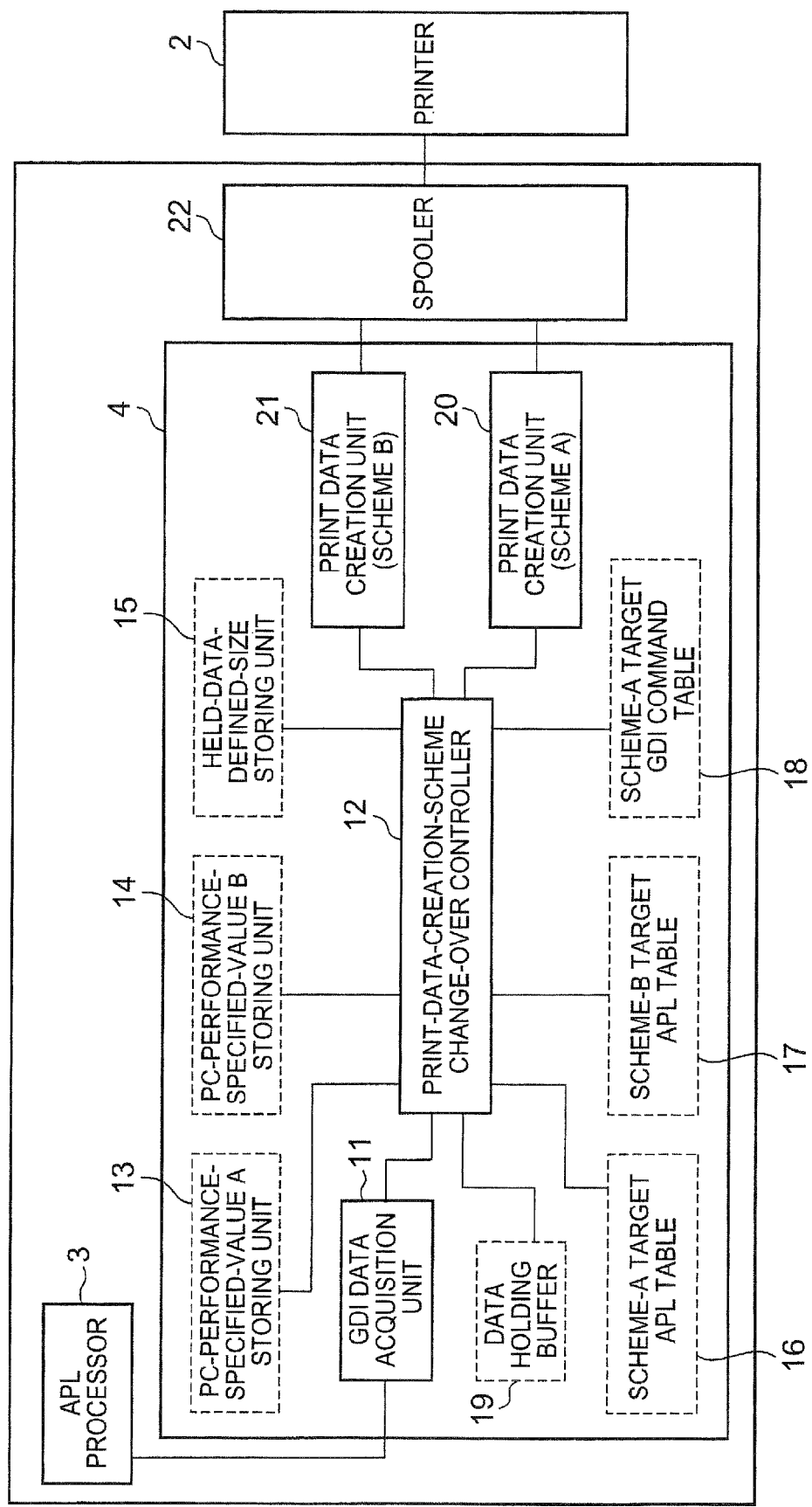
FIG. 2 is a diagram showing the specific structure of a printer driver.

FIG. 2 is a diagram showing the specific structure of the printer driver 4. In the figure, the printer driver 4 comprises a GDI data acquisition unit 11, a print-data-creation-scheme change-over controller 12, a PC-performance-specified-value A storing unit 13, a PC-performance-specified-value B storing unit 14, a held-data-defined-size storing unit 15, a scheme-A target APL, table 16, a scheme-B target APL table 17, a scheme-A target GDI command table 18, a data holding buffer 19, a print data creation unit (scheme A) 20, a print data creation unit (scheme B) 21, and a spooler 22.

The GDI data acquisition unit 11 has a function of acquiring print data (GDI data) output from the application processor 3, and supplies the GDI data to the print-data-creation-scheme change-over controller 12. The print-data-creation-scheme change-over controller 12 executes a process to be discussed later based on input data, and changes a creation scheme of print data. When executing the process, the print-data-creation-scheme change-over controller 12 refers the PC-performance-specified-value A storing unit 13, the PC-performance-specified-value B storing unit 14, the held-data-defined-size storing unit 15, and the like, and determines a change-over of the print data creation scheme.

The PC-performance-specified-value A storing unit 13, and the PC-performance-specified-value B storing unit 14 store the specified values of the performance of the personal computer. For example, the PC-performance-specified-value A storing unit 13 stores a criterion for determining whether the personal computer is high performance, i.e., registers the minimum specified value of a clock speed (e.g., 3 GHz) for operating an on-board CPU, which is a criterion for determining whether the personal computer is a high-performance computer. If the operation clock speed of the personal computer is greater than or equal to that specified value A, it is determined that the personal computer is a high-performance computer, and a process scheme A is selected. The PC-performance-specified-value B storing unit 14 stores a criterion for determining whether the performance of the personal computer is poor, i.e., registers the maximum specified value of a clock speed (e.g., 1 GHz) for operating the on-board CPU of the personal computer. If the operation clock speed of the personal computer is less than or equal to the specified value B, then the personal computer is recognized as a low-performance computer, and a process scheme B is selected. For those specified values A and B, values for determining whether the performance of the personal computer is high or low are preset and pre-stored on the basis of the processing capacity of the on-board processor of the printer 2.

The held-data-defined-size storing unit 15 stores information on the volume of data in a defined size included in a page, and for example, is set to 200 K bytes. The scheme-A target APL table 16 stores plural information on application programs (APL) to be subject to the foregoing rasterizing process 7 (subjected to scheme A). The scheme-B target APL table 17 stores information on application programs (APL) to be subject to the foregoing PDL conversion process 6 (subjected to scheme B).

FIG. 3 is a diagram showing the example of scheme-A target APL table 16. Application program names (#1, #2, and so on), such as Adobe Reader, and Adobe Acrobat (both are product names of Adobe Systems Incorporated, U.S.) are registered. FIG. 4 is a diagram showing the example of scheme-B target APL table 17. Likewise, plural pieces of information, such as Microsoft Word (product name of Microsoft Corporation, U.S.), and JustSystem ICHITARO (product name of JUSTSYSTEMS CORPORATION, JP) corresponding to application program names (#1, #2, and so on) are registered.

FIG. 5 is a diagram showing the example of the scheme-A target GDI command table 18. The scheme-A target GDI command table 18 registers information like BitBlt, Strech-Blt, corresponding to GDI data names (#1, #2, and so on). Plural pieces of information registered in the scheme-A target GDI command table 18 are used for GDI data in which a "not-set" flag is set when once selection of the scheme A or the scheme B cannot be made.

The data holding buffer 19 temporarily stores not-set GDI data when the selection of the foregoing scheme A or B cannot be made. The print data creation unit (scheme A) 20 has a function of creating print data through the scheme A, i.e., through the rasterizing process 7, while the print data creation unit (scheme B) 21 has a function of creating print data through the scheme B, i.e., the PDL conversion process 6. The spooler 22 holds print data created by the print data creation unit (scheme A) 20 or the print data creation unit (scheme B) 21, and transmits the print data to the printer 2.

Next, an explanation will be given of process operations based on the foregoing structure according to the embodiment.

Figure 6A:
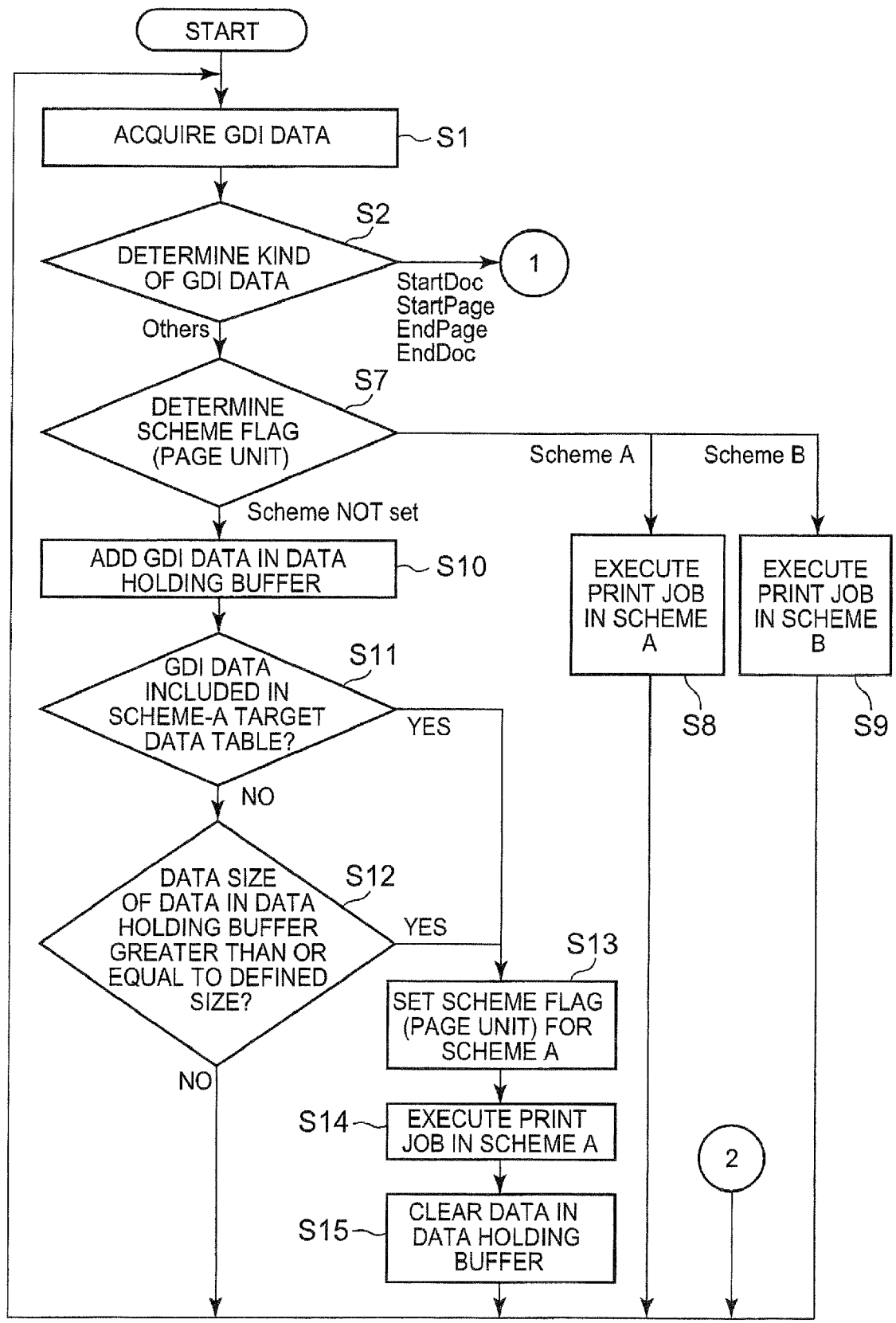
FIGS. 6A to 6B are flowcharts for explaining a process according to the embodiment.
Figure 6B:
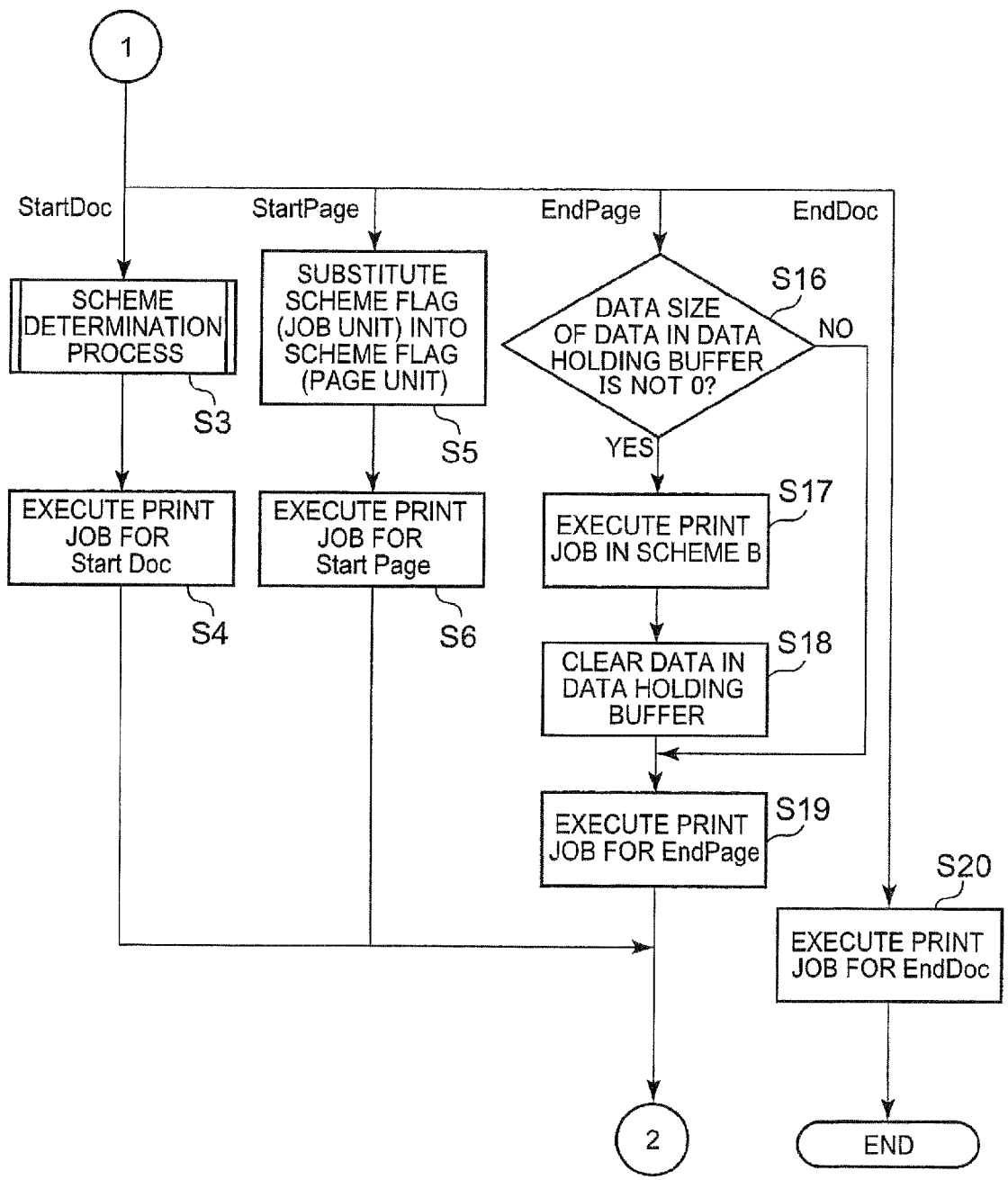

FIGS. 6A to 6B are flowcharts for explaining a process of the embodiment. First, as the GDI data acquisition unit 11 acquires GDI data output from an application processor 3, the GDI data is supplied to the print-data-creation-scheme change-over controller 12 (step S1). The print-data-creation-scheme change-over controller 12 determines the kind of the input GDI data (step S2). When the input GDI data is Start-Doc at the header of a data format, a scheme determination process is executed (step S3).

Figure 7:
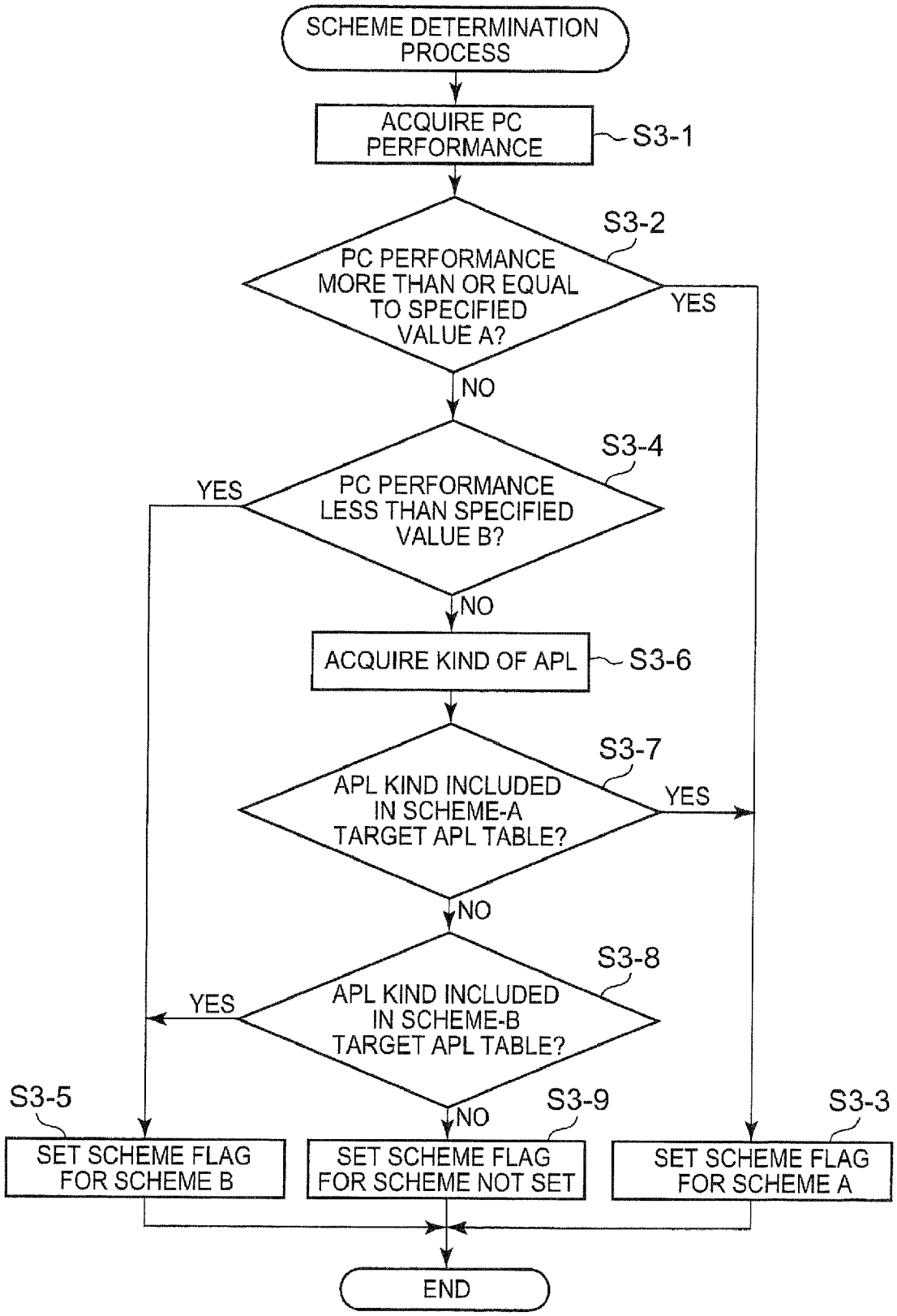
FIG. 7 is a flowchart for explaining a scheme determination process.

FIG. 7 is a flowchart for explaining the scheme determination process. First, the print-data-creation-scheme change-over controller 12 acquires information on the performance of the personal computer 1, i.e., information on the operation clock of the CPU (step S3-1). In this case, the printer driver 4 acquires information on a clock signal, which is sent out from a clock signal generator (CLK) and is for operating the CPU of the personal computer 1, from the application processor 3.

Next, the print-data-creation-scheme change-over controller 12 compares the acquired clock speed information with a specified value A (3 GHz) stored in the PC-performance-specified-value A storing unit 13 (step S3-2). If the clock speed is greater than or equal to the preset value A (3 GHz) (step S3-2: YES), the print-data-creation-scheme change-over controller 12 determines that the PC has a high performance, and sets a scheme flag (print job unit) for the scheme A (step S3-3). On the other hand, if the clock speed is less than the specified value A (step S3-2: NO), the print-data-creation-scheme change-over controller 12 compares the acquired clock speed information with the specified value B (1 GHz) stored in the PC-performance-specified-value B storing unit 14 (step S3-4). If the clock speed is less than the specified value B (1 GHz), for example, 500 KHz (step S3-4: YES), it is determined that the PC has a poor performance, and a scheme flag (job unit) is set for the scheme B (step S3-5). If the clock speed is greater than or equal to the specified value B and is less than or equal to the specified value A, e.g., 2 GHz (step S3-2: NO, step S3-4: NO), determination of a change-over of the print data creation scheme is not decided based on the performance of the PC, and the kind of a next application (APL) is acquired (step S3-6).

That is, the print-data-creation-scheme change-over controller 12 refers the scheme-A target APL table 16 shown in FIG. 3, and determines whether or not an application to be used is an application registered in the scheme-A target APL table 16 (step S3-7). For example, when an application to be used is foregoing Adobe Reader, Adobe Acrobat, or the like (step S3-7: YES), the print-data-creation-scheme change-over controller 12 sets a scheme flag (job unit) for the scheme A (step S3-3). On the other hand, when the application to be used is foregoing Microsoft Word, JustSystem ICHITARO, or the like (step S3-7: NO, and step S3-8: YES), the print-data-creation-scheme change-over controller 12 sets a scheme flag (job unit) for the scheme B (step S3-5). When the application to be used is not included in both scheme-A target APL table 16 and scheme-B target APL table 17 (step S3-7: NO, and step S3-8: NO), the print-data-creation-scheme change-over controller 12 sets a scheme flag (job unit) as "scheme-not-set" (flag indicating that scheme is not set) (step S3-9).

According to the foregoing process, when the clock speed of the personal computer 1 used in the embodiment is greater than or equal to the specified value A (e.g., 3 GHz) stored in the PC-performance-specified-value A storing unit 13, the personal computer 1 is determined as a high-performance PC, and the process speed will not decrease even if the personal computer 1 executes processes up to the rasterizing process 7, and GDI data is transmitted to the print data creation unit (scheme A) 20 which executes the rasterizing process. In contrast, when clock speed of the personal computer 1 used in the embodiment is slower than the specified value B (e.g., 1 GHz) stored in the PC-performance-specified-value B storing unit 14, the personal computer 1 is determined as a poor-performance PC, so that the personal computer 1 executes processes up to the PDL conversion process 6, and the printer 2 executes the rasterizing process.

When the application to be used is Adobe Reader or the like, the personal computer 1 executes processes up to the rasterizing process 7, and when the application to be used is the foregoing application like Microsoft Word, the printer 2 executes the rasterizing process.

Next, return to the flowchart in FIG. 6B, the print data creation unit (scheme A) 20 or the print data creation unit (scheme B) 21 creates print data in accordance with the designation (step S4).

In the determination (in step S2), when the GDI data is StartPage, the process (step S5) is executed, and data of the foregoing scheme flag (job unit) is substituted into a scheme flag (page unit). For example, when the scheme A is set through the foregoing process, the scheme flag (page unit) is set to A, and when the scheme B is set, the scheme flag (page unit) is set to B, and when the scheme is not set, the scheme flag is set to "not-set" (flag indicating that the scheme is not set). Thereafter, the print data creation unit (scheme A) 20 or the print data creation unit (scheme B) 21 creates print data in accordance with the designation (step S6).

On the other hand, in the determination (in step S2), when the GDI data is not StartDoc, StartPage, EndDoc, and EndPage (the latter two are described later), the kind of the scheme flag (page unit) is determined (step S7), and in case of the scheme A, the print data creation unit (scheme A) 20 executes a process (step S8), and in case of the scheme B, the print data creation unit (scheme B) 21 executes a process (step S9). In case of the not-set scheme (flag indicating that the scheme is not set), the data holding buffer 19 holds the GDI data (step S10).

In this case, the print-data-creation-scheme change-over controller 12 further refers the scheme-A target GDI command table 18, and determines whether or not the input GDI data includes data registered in that table (step S11). For example, when data, such as foregoing BitBlt or StrechBlt is included, the scheme flag (page unit) is set to A (step S13), and a print job is executed in the scheme A (step S14). Thereafter, the GDI data stored in the data holding buffer 19 is cleared out (step S15).

Since BitBlt is a color-image instruction, and StrechBlt is a color-image instruction including an enlargement or reduction process, the process becomes complex, so that the scheme A (i.e., the scheme of causing the PC to execute the rasterizing process) is selected.

On the other hand, in a case where the size of the GDI data held in the data holding buffer 19 is greater than or equal to the defined size (step S12: YES), the scheme flag (page unit) is likewise set to A (step S13), and a print job is executed in the scheme A (step S14). It is more efficient to process hefty data having a large size in the scheme A (in which the PC executes the rasterizing process) rather than to cause the processor of the printer having a low processing capacity to execute the rasterizing process.

If it is detected that the size of the GDI data held in the data holding buffer 19 is not greater than or equal to the defined size (step S12: NO), e.g., it is not greater than or equal to 200 K bytes, the data holding buffer 19 keeps holding the GDI data.

Thereafter, when EndPage is input as GDI data, determination on the data held in the data holding buffer 19 is carried out (step S16), and a print job is executed in the scheme B (step S17) when the size of the data held in the data holding buffer 19 is not zero, and the GDI data held in the data holding buffer 19 is cleared out (step S18).

The print data creation unit (scheme A) 20 or the print data creation unit (scheme B) 21 creates print data in accordance with the designation (step S19).

Thereafter, as StartPage is input again as GDI data, the foregoing process is repeated, and information on the scheme A, the scheme B, or the "scheme-not-set" (flag indicating that the scheme is not set) is written in the scheme flag (page unit), and the print data creation unit (scheme A) 20 or the print data creation unit (scheme B) 21 executes a print data creation process.

Note that in a case where EndDoc described at the end of a data format is input as GDI data, the print data creation unit (scheme A) 20 or the print data creation unit (scheme B) 21 creates print data in accordance with the designation (step S20).

According to the foregoing process, first, a printing scheme is designated based on the performance of the personal computer 1 and the kind of an application (APL), and when determination cannot be made through the foregoing determination method, the printing scheme is then decided based on a command included in GDI data and a data size. This enables an automatic setting of the most appropriate printing scheme.

Setting the printing scheme based on a command and a page size of GDI data enables a more-detailed selection of the printing scheme.

That is, the most appropriate print data processing scheme can be automatically selected in accordance with the performance of the personal computer executing an application program for creating print data, the kind of the application program, the content of GDI data included in created print data, and the like, and a print job for the print data can be efficiently executed at the fastest speed.

Note that pint data created by the print data creation unit (scheme A) 20 and undergone rasterizing is transmitted to the image memory 9 of the printer 2 from the spooler 22, rendered in the image memory 9, transmitted to a printer engine 10, and a print job is executed on a recording medium. Moreover, print data created by the print data creation unit (scheme B) 21 and is remained in the PDL format is transmitted to the rasterizing processor 8 of the printer 2, is subjected to rasterizing by an I/F controller (I/F), rendered in the image memory 9, transmitted to the printer engine 10, and a print job is executed on a recording medium.

In the foregoing embodiment, although the printing scheme is set based on the kind of a command included in GDI data for page unit, the printing scheme can be selected based on the kind of a command for all pages.

Command analysis on GDI data of a first page may be particularly executed, and the performance of the personal computer (PC) is not limited to the clock speed, but determination may be made based on, for example, the number of cores of a CPU.

Further, the extension of a file may be determined in the determination of an application and print data. The types of the printing schemes are not limited to two types of A and B, and more than or equal to three types of printing schemes may be set.

In the foregoing embodiment, the explanation has been given of a case where the printing scheme is selected based on the performance of the personal computer 1 and the kind of an application (APL) at first, and the printing scheme is selected based on a command included in GDI data and a data size when determination cannot be made through the foregoing determination method, but it is possible to employ a scheme of selecting the print job scheme using only the latter determination method (identification of a command in GDI data/data size identification).

The definition of the "kind" is arbitral. The "kind" of the application program may be determined based on types of data, for example, text data, image data (bit map data, vector data), of out data from the application program.

The printer in the foregoing embodiment may be any device having a printing function, like a multifunction printer.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2007-106036 filed on Apr. 13, 2007 and Japanese Patent Application No. 2008-048067 filed on Feb. 28, 2008, including specification, claims, drawings and summary. The disclosure of the above Japanese Patent Applications are incorporated herein by reference in its entirety.

What is claimed is:

1. A host device connectable to a printing device, comprising:
   an application processor which executes an application program that creates print data;
   a first conversion unit configured to convert the print data created by the application program into rasterized image data;
   a second conversion unit configured to convert the print data created by the application program into PDL data;
   a first PC-performance-specified-value storing unit which stores a first operation clock speed indicating a high-performance on-board processor;
   a second PC-performance-specified-value storing unit which stores a second operation clock speed indicating a low-performance on-board processor;
   a first application list storing unit which stores a first list of a plurality of application programs;
   a second application list storing unit which stores a second list of a plurality of application programs;
   a command table storing unit which stores information regarding a plurality of commands which may be included in the print data;
   a data holding buffer configured to temporarily hold the print data;
   a first control unit which: (i) converts the print data using the first conversion unit when an operation clock speed of the application processor is determined to be greater than or equal to the first operation clock speed, and (ii) converts the print data using the second conversion unit when the operation clock speed of the application processor is determined to be less than or equal to the second operation clock speed;
   a second control unit which: (i) converts the print data using the first conversion unit when the application program executed by the application processor is on the first list of the plurality of application programs; and (ii) converts the print data using the second conversion unit when the application program is on the second list of the plurality of application programs;
   a third control unit which converts the print data using one of the first and second conversion units depending on whether or not the print data includes any of the plurality of commands stored in the command table storing unit;
   a fourth control unit which converts the print data held in the buffer using one of the first and second conversion units depending on whether or not a size of the print data held in the buffer is more than a predetermined size; and
   a transmission unit which transmits the print data converted by the first, second, third, and fourth control units, wherein the first to fourth control units operate in sequence such that the first control unit operates before the second control unit, the second control unit operates before the third control unit, and the third control unit operates before the fourth control unit.

2. The host device according to claim 1, wherein the third control unit converts the print data using the first conversion unit when it is determined that the print data includes any of the plurality of commands stored in the command table storing unit.

3. The host device according to claim 2, wherein the fourth control unit converts the print data held in the buffer using the first conversion unit when it is determined that the size of the print data held in the buffer is more than the predetermined size.

4. The host device according to claim 1, wherein in the first and second control units, the determination is performed with respect to a first page of the print data, and the conversion with respect to subsequent pages of the print data is performed in accordance with a determination result of the first page.

5. The host device according to claim 3, wherein in the third and fourth control units, the determination is performed on a page-by-page basis.

* * * * *